United States Patent
Mo et al.

(10) Patent No.: US 7,296,739 B1
(45) Date of Patent: Nov. 20, 2007

(54) MANAGING ON-LINE TRANSACTIONS

(75) Inventors: Stanley Mo, Portland, OR (US); David B. Kinder, Portland, OR (US); Linda B. Welsh, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,968

(22) Filed: Mar. 31, 2000

(51) Int. Cl.
*G06Q 30/00* (2006.01)

(52) U.S. Cl. ......... 235/385; 705/28
(58) Field of Classification Search ......... 705/28; 235/385
See application file for complete search history.

(56) References Cited

U.S. PATENT DOCUMENTS

| | | | | |
|---|---|---|---|---|
| 3,686,637 A * | 8/1972 | Zachar et al. | ......... | 711/5 |
| 4,478,316 A * | 10/1984 | Davidson | ......... | 188/71.9 |
| 4,797,819 A * | 1/1989 | Dechirot | ......... | 705/28 |
| 5,168,445 A * | 12/1992 | Kawashima et al. | ......... | 705/10 |
| 5,310,997 A * | 5/1994 | Roach et al. | ......... | 235/375 |
| 5,374,813 A * | 12/1994 | Shipp | ......... | 235/375 |
| 5,434,394 A * | 7/1995 | Roach et al. | ......... | 235/375 |
| 5,615,109 A * | 3/1997 | Eder | ......... | 395/208 |
| 5,712,789 A * | 1/1998 | Radian | ......... | 364/874.14 |
| 5,765,143 A * | 6/1998 | Sheldon et al. | ......... | 705/28 |
| 5,842,118 A * | 11/1998 | Wood, Jr. | ......... | 455/101 |
| 5,854,746 A * | 12/1998 | Yamamoto et al. | ......... | 700/106 |
| 5,856,931 A * | 1/1999 | McCasland | ......... | 702/182 |
| 5,953,707 A * | 9/1999 | Huang et al. | ......... | 705/10 |
| 5,960,414 A * | 9/1999 | Rand et al. | ......... | 705/28 |
| 6,006,196 A * | 12/1999 | Feigin et al. | ......... | 705/28 |
| 6,012,041 A * | 1/2000 | Brewer et al. | ......... | 705/28 |
| 6,023,610 A * | 2/2000 | Wood, Jr. | ......... | 455/101 |
| 6,052,755 A * | 4/2000 | Terrill et al. | ......... | 711/103 |
| 6,144,945 A * | 11/2000 | Garg et al. | ......... | 705/28 |
| 6,148,291 A * | 11/2000 | Radican | ......... | 705/28 |
| 6,154,738 A * | 11/2000 | Call | ......... | 707/4 |
| 6,167,380 A * | 12/2000 | Kennedy et al. | ......... | 705/28 |
| 6,182,053 B1 * | 1/2001 | Rauber et al. | ......... | 705/28 |
| 6,188,991 B1 * | 2/2001 | Rosenweig et al. | ......... | 705/28 |
| 6,204,763 B1 * | 3/2001 | Sone | ......... | 340/568.1 |
| 6,205,431 B1 * | 3/2001 | Willemain et al. | ......... | 705/10 |
| 6,240,398 B1 * | 5/2001 | Allen et al. | ......... | 705/28 |
| 6,246,995 B1 * | 6/2001 | Walter et al. | ......... | 705/22 |
| 6,249,774 B1 * | 6/2001 | Roden et al. | ......... | 705/28 |
| 6,269,344 B1 * | 7/2001 | Junger | ......... | 705/28 |
| 6,289,209 B1 * | 9/2001 | Wood, Jr. | ......... | 455/277.1 |
| 6,336,101 B1 * | 1/2002 | Dean et al. | ......... | 705/29 |
| 6,338,045 B1 * | 1/2002 | Pappas | ......... | 705/29 |

(Continued)

OTHER PUBLICATIONS

Auld, Bev, Microsoft announces SQL server, Business Wire, New York, Mar. 29, 1993, 4 pages.*

*Primary Examiner*—Andrew Joseph Rudy
(74) *Attorney, Agent, or Firm*—Trop, Pruner & Hu, P.C.

(57) ABSTRACT

On-line transactions may be managed between an on-line transaction service and a product vendor inventory management system by providing allocations of dedicated inventory from the system to the service. The service then may complete on-line transactions against the allocation without needing to contact the service to authorize each transaction. This may speed up the rate at which on-line transactions are completed and increase the number of transactions that can be completed by the on-line transaction service.

25 Claims, 3 Drawing Sheets

U.S. PATENT DOCUMENTS

| | | | |
|---|---|---|---|
| 6,341,271 B1 * | 1/2002 | Salvo | 705/28 |
| 6,345,259 B1 * | 2/2002 | Sandoval | 705/7 |
| 6,351,630 B2 * | 2/2002 | Wood, Jr. | 455/101 |
| 6,351,734 B1 * | 2/2002 | Lautzenheiser et al. | 705/8 |
| 6,385,593 B2 * | 5/2002 | Linberg | 705/28 |
| 6,386,450 B1 * | 5/2002 | Ogasawara | 235/383 |
| 6,401,074 B1 * | 6/2002 | Sleeper | 705/14 |
| 6,405,178 B1 * | 6/2002 | Manchala et al. | 705/29 |
| 6,415,341 B1 * | 7/2002 | Fry et al. | 710/62 |
| 6,418,416 B1 * | 7/2002 | Rosenberg et al. | 705/28 |
| 6,418,441 B1 * | 7/2002 | Call | 707/10 |
| 6,560,592 B1 * | 5/2003 | Reid et al. | 707/2 |
| 6,578,013 B1 * | 6/2003 | Davis et al. | 705/26 |
| 6,609,101 B1 * | 8/2003 | Landvater | 705/10 |
| 6,901,430 B1 * | 5/2005 | Smith | 709/206 |
| 6,925,447 B2 * | 8/2005 | McMenimen et al. | 705/28 |
| 2001/0027483 A1 * | 10/2001 | Gupta et al. | 709/219 |
| 2002/0007618 A1 * | 1/2002 | Armington et al. | 53/472 |

* cited by examiner

MANAGING ON-LINE TRANSACTIONS

BACKGROUND

This invention relates generally to electronic commerce and particularly to managing on-line transactions for the sale of goods or services.

In a number of instances in connection with on-line transactions, one entity is responsible for completing the on-line transaction with a customer. For present purposes that entity will be called the "on-line transaction service". Typically, the on-line transaction service is a server which is coupled to the Internet. Customers access the Internet web address and web pages maintained by the on-line transaction service. From these web pages, the customers can obtain information about available products. In addition, the on-line transaction service provides software for implementing on-line sales of goods and services. Thus, the on-line transaction service takes care of implementing the transaction to purchase the goods or services.

Generally, on-line transactions also involve order fulfillment. Commonly, the order fulfillment may be undertaken by an entity different than the on-line transaction service. In order to implement order fulfillment, an inventory management system may be utilized. The inventory management system keeps track of the actual physical inventory that the product supplier has in place. This inventory may be actual existing inventory or the inventory that will exist based on current product schedules. Generally, the inventory management system is associated with a product vendor which may be the distributor or manufacturer of a given product. The inventory management system of the product's vendor is referred to herein as the product vendor inventory management system. It may be implemented by a server coupled to a network such as the Internet.

Thus, typically the on-line transaction proceeds with a customer accessing the on-line transaction service's web site and making a request for a purchase. The on-line transaction service typically contacts the product vendor inventory management system to determine whether the inventory is available in the time frame typically associated with such transactions. If so, the on-line transaction service may proceed to complete the transaction with the on-line customer. The service may notify the product vendor inventory management system of the transaction so that the inventory management system may appropriately adjust its available inventory.

While the system works very well in some circumstances, when the demand for products is particularly high, the system may break down. In particular, the delay inherent in accessing the inventory management system may be extended because of current bandwidth capacity on the Internet and the number of requests for inventory management information coming into the inventory management system.

Thus, the on-line customer may grow impatient and may not wish to wait the time needed to verify that the inventory is available. This may result in lost sales. Moreover, the on-line transaction service may be bogged down by on-line customers simply connected and waiting for verification of their transactions. This may result in a decreased rate at which transactions may be completed by the on-line transaction service.

Thus, there is a need for a better way to manage on-line transactions which reduces delay and conserves bandwidth.

DETAILED DESCRIPTION

Figure 1:
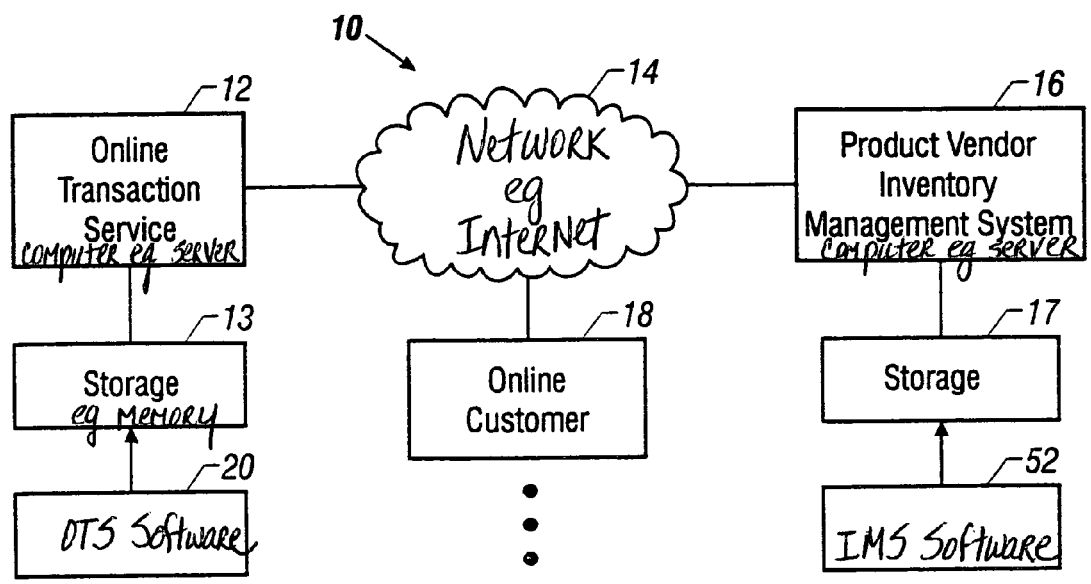
FIG. 1 is a schematic depiction of one embodiment of the present invention.

Referring to FIG. 1, an e-commerce system 10 may connect an on-line customer 18 with an on-line transaction service 12. The on-line transaction service 12 may include a server which presents web pages for viewing by on-line customers 18 coupled to a network 14 such as the Internet. The on-line customer may decide to make various purchases by inputting information into graphical user interfaces provided by the service 12.

Before the on-line transaction service 12 confirms the transaction requested by the on-line customer 18 over the network 14, the on-line transaction service 12 checks its available inventory of a given product. This check ensures that the requested product is or will be available in the time frame normally implemented by the service 12 or as requested by the on-line customer 18.

In accordance with one embodiment of the present invention, the on-line transaction service 12 maintains an inventory or product allocation for various products which it offers for sale to on-line customers. The on-line transaction service 12 receives its allocation or inventory by a query made of the product vendor inventory management system 16. However, instead of simply clearing one specific transaction, the on-line transaction service 12 requests an allocation of some number of products from the product vendor inventory management system 16. The service 12 may determine, based on current demand, a suitable inventory to be allocated to the service 12. The generation of this allocation may be done in software implemented by agreement between the service 12 and the system 16 in one embodiment of the invention.

When the on-line transaction service 12 finds that its inventory in a given product or set of products has been sufficiently depleted, the service 12 contacts the system 16 to gain additional inventory. As transactions complete, the service 12 decrements its inventory allocation until such time as the inventory falls below a level which triggers a request for an inventory or allocation replenishment.

Software 20 may be stored on a storage 13 associated with the server utilized by the service 12. Similarly, software 52 may be stored on storage 17 associated with the system 16.

In this way, it is not necessary for the service 12 to delay implementing the transaction with the customer while checking with the system 16 to ensure that the system 16 still has available inventory. The service 12 may be secure in knowing that it has received a pre-allocation of a given inventory against which it can complete transactions for a given period of time. Thus, the number of times that the service 12 must contact the system 16 may be decreased.

This may result in faster transactions with each on-line customer and the ability of the service 12 to handle a higher number of customers in a given period of time.

Figures 2, 3:
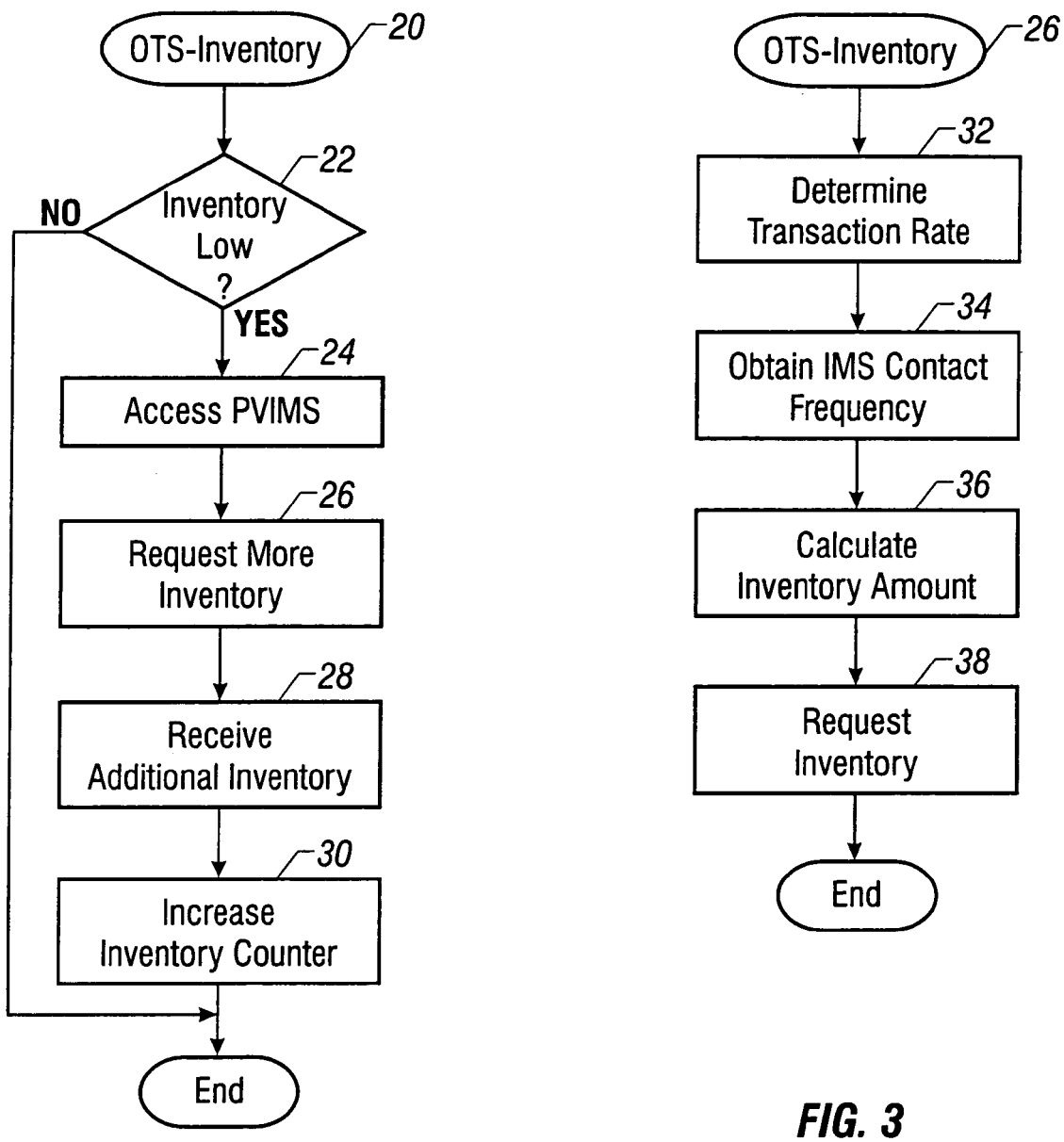
FIG. 2 is a flow chart for software used by the on-line transaction service in accordance with one embodiment of the present invention.
FIG. 3 is a flow chart for software which may be utilized by the on-line transaction service in accordance with one embodiment of the invention.

Referring to FIG. 2, the software 20 stored on the storage 13 associated with the service 12 begins by checking whether an allocation for a given product or group of products is too low as indicated in diamond 22. The inventory low indication may be set to a predetermined inventory number for each product. When the available inventory drops below that number, an inventory low indication may be set. Alternatively, the inventory low indication may be set dynamically. That is, it may be set in terms of a given amount of time. Depending on the rate of on-line transactions, a higher inventory level should trigger a low inventory indication. Thus, in periods of low activity, the low inventory indication may be set at a low inventory level and in periods of high activity, the low inventory indication may be set higher. This accommodates for the dynamic nature of transactions and helps to prevent unnecessary requests for inventory allocation. Moreover, it may decrease the likelihood of an inventory depletion.

In the case where the inventory is too low, the product vendor inventory management system 24 may be accessed over the network 14 as indicated in block 24. The on-line transaction service 12 may request additional inventory as indicated in block 26. The additional inventory may then be granted by the product vendor inventory management system 16 as indicated in block 28. In such case, the on-line transaction service 12 increases its inventory counter corresponding to the allocation received, as indicated in block 30.

Referring next to FIG. 3, the software 26 for implementing the request for more inventory is shown in greater detail. Initially, the software 26 determines the rate of transactions as indicated in block 32. In cases where the transaction rate is very high, it may be necessary to request higher inventory allocations or to request inventory allocations more frequently. An inventory management system contact frequency level may then be obtained (block 34). The product vendor inventory management system 16 and the on-line transaction service 12 may agree upon a frequency or rate of requests for allocation increases. This rate may be in terms of a time so that the on-line transaction service need not contact the system 16 at a frequency greater than some agreed upon level. This frequency information may be pre-stored by agreement in the on-line transaction service 12.

As indicated in block 36, the requested inventory amount may then be calculated as a function of the transaction rate and the agreed upon contact frequency. Thus, in cases where the transaction rate is high, a higher inventory allocation may be requested. The calculated inventory amount may then be requested as indicated in block 38. Alternatively, a look up table may be used.

The equation for determining the inventory amount may be predetermined between the on-line transaction service 12 and the system 16. In such case, the requested amount is automatically granted by the system 16 if available. In other embodiments, the on-line transaction service may provide more information, such as the transaction rate, to the inventory management system which may then determine an appropriate allocation from the viewpoint of the product vendor. Other variations are possible as well.

Figure 4:
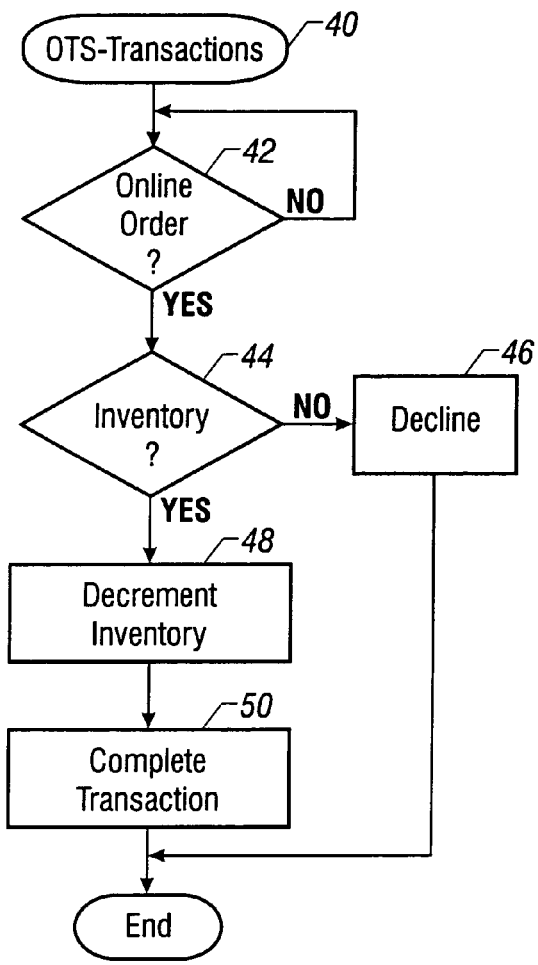
FIG. 4 is a flow chart for software which may utilized by the on-line transaction service in accordance with one embodiment of the present invention.

Turning next to FIG. 4, the software 40 is responsible for actually implementing the on-line transaction in accordance with one embodiment of the present invention. When an on-line order is received as determined at diamond 42, a check at diamond 44 determines whether an inventory allocation sufficient to accept the order is currently available. If not, the order is declined as indicated in block 46. Otherwise, the inventory allocation is decremented as indicated in block 48, and the transaction is completed as indicated in block 50.

Figure 5:
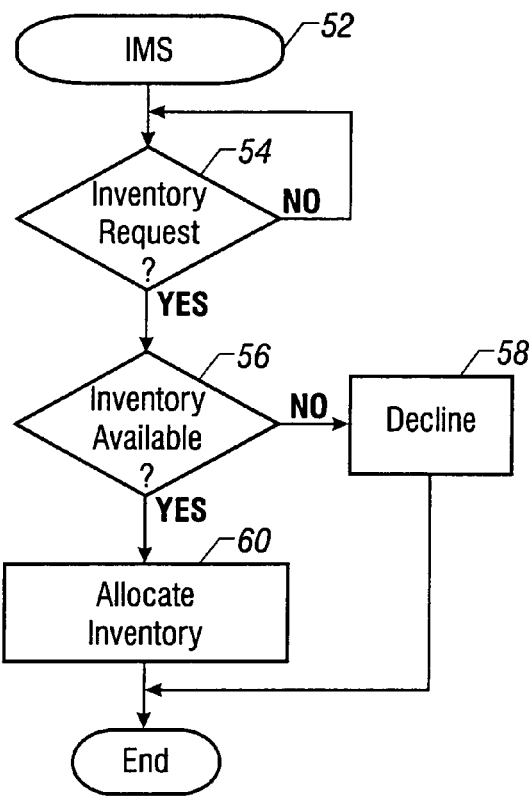
FIG. 5 is a flow chart of software which may be utilized by a product vendor inventory management system in accordance with one embodiment of the present invention.

The software 52, shown in FIG. 5, resident on the storage 17 associated with the system 16 server begins by checking for an inventory allocation request from the on-line transaction service 12, as indicated in diamond 54 in accordance with one embodiment of the present invention. If the inventory is available as determined at diamond 56, the inventory may be automatically allocated as indicated in block 60. Otherwise, the inventory allocation request may be declined as indicated in block 58. The declination may be a total declination or may simply amount to an offer to provide whatever inventory is available at the current time. It may also provide the on-line transaction service 12 with information about what additional inventory may be available. This information may be offered to the on-line customer by the on-line transaction service 12 to determine if the customer is willing to wait the necessary time.

In some embodiments, the inventory allocation may be afforded for a predetermined time. At the end of that time, the inventory allocation may be automatically returned to the system 16.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method to be implemented by a server for an on-line transaction service, the method comprising:

receiving an electronic indication of an inventory allocation;

completing a plurality of on-line sales transactions against said allocation; and in response to the depletion of said allocation, automatically requesting an additional inventory allocation, said request based on a predetermined frequency for requests for an additional inventory allocation and upon the rate at which on-line sales transactions are being completed.

2. The method of claim 1 further including maintaining a count of available inventory allocation and decrementing said count as each on-line transaction is completed.

3. The method of claim 1 wherein receiving an electronic indication of an inventory allocation includes receiving said inventory allocation from a remote site.

4. The method of claim 1 wherein receiving an electronic indication of an inventory allocation includes receiving said allocation over a network.

5. The method of claim 4 wherein receiving an electronic indication of an inventory allocation includes receiving said allocation over the Internet.

6. The method of claim 1 wherein requesting an additional inventory allocation includes determining whether the inventory allocation needs to be replenished.

7. The method of claim 6 wherein determining whether the inventory allocation needs to be replenished includes determining whether an inventory allocation has been reduced through the completion of on-line transactions below a dynamically-set level.

8. The method of claim 6 including, if the rate at which on-line transactions are being completed is high, setting the dynamically-set level high and automatically requesting a large additional inventory allocation.

9. The method of claim 8 including, if the rate at which on-line transactions are completed is low, setting the dynamically-set level low and automatically requesting a small additional inventory allocation.

10. An article comprising a medium for storing instructions that enable a server for an on-line sales transaction service to:
  receive an electronic indication of an inventory allocation;
  complete a plurality of on-line sales transactions against said allocation; and
  in response to the depletion of said allocation, automatically request an additional inventory allocation based on a predetermined frequency for requests for an additional inventory allocation and upon the rate at which on-line sales transactions are being completed.

11. The article of claim 10 further storing instructions that enable a server for an on-line sales transaction service to maintain a count of available inventory allocation and decrement said count as each on-line transaction occurs.

12. The article of claim 10 further storing instructions that enable a server for an on-line sales transaction service to receive an inventory allocation from a remote site.

13. The article of claim 10 further storing instructions that enable a server for an on-line sales transaction service to receive said allocation over a network.

14. The article of claim 13 further storing instructions that enable a server for an on-line sales transaction service to receive said allocation over the Internet.

15. The article of claim 10 further storing instructions that enable a server for an on-line sales transaction service to determine whether to request an additional inventory allocation based on the number of on-line sales transactions completed against said allocation.

16. The article of claim 15 further storing instructions that enable a server for an on-line sales transaction service to determine whether the inventory allocation has been reduced below a dynamically-set level.

17. The article of claim 16 further storing instructions that enable a server for an on-line sales transaction service to set the dynamically-set level high and to automatically request a large additional inventory allocation if the rate at which on-line transactions are being completed is high.

18. The article of claim 17 further storing instructions that enable a server for an on-line sales transaction service to set the dynamically-set level low and to automatically request a small additional inventory allocation if the rate at which on-line transactions are completed is low.

19. A system comprising:
  a server that completes a plurality of on-line sales transactions against an electronic indication of an inventory allocation;
  a memory coupled to said server that stores said inventory allocation; and
  said server decrements said inventory allocation with each on-line sales transaction, monitors the inventory allocation and automatically requests an additional inventory allocation based on a predetermined frequency for requests for an additional inventory allocation and upon the rate at which on-line sales transactions are being completed.

20. The system of claim 19 wherein said server is coupled to the Internet and completes transactions over the Internet.

21. The system of claim 19 wherein said server dynamically determines when to request an additional inventory allocation based on the rate at which transactions are being completed.

22. The system of claim 21 wherein said server includes an inventory low indicator that is set dynamically, said server requests a larger additional inventory allocation if said inventory low indicator is dynamically set high.

23. The system of claim 22 wherein said server requests a smaller additional inventory allocation if said inventory low indicator is dynamically set low.

24. The system of claim 19 wherein the server automatically requests an additional inventory based on a predetermined frequency for requests that is agreed upon with an on-line vendor.

25. The system of claim 19 wherein said system is an on-line sales transaction service.

* * * * *